United States Patent [19]

Ina et al.

[11] Patent Number: 4,891,634
[45] Date of Patent: Jan. 2, 1990

[54] IMAGE PROCESSING SYSTEM WITH DESIGNATABLE OUTPUT LOCATION AND OUTPUT RESOLUTION CONTROL

[75] Inventors: Kenzoh Ina; Yasuhisa Ishizawa, both of Yokohama; Hideo Kuo, Machida, all of Japan

[73] Assignee: Canon Kabushiki Kaisha, Tokyo, Japan

[21] Appl. No.: 177,899

[22] Filed: Apr. 1, 1988

Related U.S. Application Data

[63] Continuation of Ser. No. 658,760, Oct. 9, 1984, abandoned.

[30] Foreign Application Priority Data

Oct. 17, 1983 [JP] Japan ................................. 58-193872
Oct. 17, 1983 [JP] Japan ................................. 58-193873

[51] Int. Cl.$^4$ ........................................... G09G 1/00
[52] U.S. Cl. ................................... 340/723; 340/728; 340/731
[58] Field of Search ............... 340/700, 720, 717, 728, 340/731, 723; 382/47

[56] References Cited

U.S. PATENT DOCUMENTS

| | | | |
|---|---|---|---|
| 4,242,678 | 12/1980 | Somerville | 340/731 |
| 4,528,561 | 7/1985 | Kitamura | 340/728 |
| 4,574,279 | 3/1986 | Roberts | 340/745 |
| 4,658,299 | 4/1987 | Tanaka et al. | 358/256 |
| 4,675,908 | 6/1987 | Saito et al. | 382/47 |

FOREIGN PATENT DOCUMENTS

| | | | |
|---|---|---|---|
| 3141450 | 6/1982 | Fed. Rep. of Germany | |
| 3437336 | 5/1985 | Fed. Rep. of Germany | |
| 53-110912 | 3/1980 | Japan | 340/717 |
| 2141899 | 1/1985 | United Kingdom | |

OTHER PUBLICATIONS

Lak et al., NAPLPS Standard Graphics and Microcomputer, Jul. 1983, BYTE Publications Inc.

*Primary Examiner*—David K. Moore
*Assistant Examiner*—Jeffery A. Brier
*Attorney, Agent, or Firm*—Fitzpatrick, Cella, Harper & Scinto

[57] ABSTRACT

An image processing system having an original reader for reading an original image, low- and high-speed printers, a work station having a microcomputer and internal and external memories, an image file, a microfilm reader, and a CRT. When a selected printer has a pixel density different from that of the input information, the pixel density of the input image information is converted and the image information is then produced from the selected printer.

16 Claims, 4 Drawing Sheets

IMAGE PROCESSING SYSTEM WITH DESIGNATABLE OUTPUT LOCATION AND OUTPUT RESOLUTION CONTROL

This application is a continuation-in-part continuation of application Ser. No. 658,760 filed Oct. 9, 1984 now abandoned.

BACKGROUND OF THE INVENTION

1. Field of the Invention

The present invention relates to an image processing system which is capable of performing an image processing operation suitable for the performance of each device in the system.

2. Description of the Prior Art

When two printers capable of different performance are connected to an input side of an image information processing system, a selection is made between the two printers unless the two printers must simultaneously be operated. However, in an image information processing system having a plurality of terminals, if both input and output devices have input and output densities (e.g., the input device has an input density or a resolution of 8, 12 or 16 lines/mm), the output device must have a resolution comparable to that of the input device. This has imposed a limit in the flexibility of the system. In a system having a single input device and a plurality of output devices, it is difficult to connect output devices of different resolutions. When output devices of different resolutions are actually connected to the system and when outputs must be produced from more than one of the output devices, selection among the performances of the selected output devices presents a problem. When the performance of the output device having the lowest resolution is selected, higher performances of other output devices cannot be utilized. In addition, even if the performance of the output device having the lowest resolution is selected, other problems are still encountered. For example, a great difference occurs between the input and output information (when information inputted through an input device having a resolution of 16 lines/mm is directly outputted through an output device having a resolution of 12 lines/mm, the ratio of an input area to an output area becomes the second power of 16/12), so that an optical output cannot be obtained.

SUMMARY OF THE INVENTION

The present invention has been made in consideration of the above and has as its object to provide an image processing system which is capable of performing an image processing operation suitable for the performance of each device in the system.

It is another object of the present invention to provide an image processing system which can optimally control a pixel density of image information in accordance with the system.

It is still another object of the present invention to provide an image processing system which can optimally utilize the performance of each device in the system when information is outputted to respective output devices of the system which have different performances.

It is still another object of the present invention to provide an image processing system which is capable of detecting a parameter associated with image processing of each output device.

It is still another object of the present invention to provide an image processing system which can detect a parameter associated with image processing of each output device and can perform pixel density conversion between an input device and an output device.

It is still another object of the present invention to provide an image processing system which can detect each device connected to the system.

It is still another object of the present invention to provide an image processing system which can convert pixel density information between a means for outputting image information and means for storing the image information.

It is still another object of the present invention to provide an image processing system which has a bypass mode for performing image transmission between a set of input and output devices and a mode for transmitting image information to another terminal and which can perform pixel density conversion processing in either mode.

It is still another object of the present invention to provide an image processing system which has an automatic mode and a manual mode for setting a desired pixel density in pixel density conversion processing between input/output devices.

It is still another object of the present invention to provide an image processing system which can set a magnification of an output image relative to an input image from an input device side or from a work station side.

DETAILED DESCRIPTION OF THE PREFERRED EMBODIMENTS

The present invention will now be described in detail with reference to the accompanying drawings.

Figure 1:
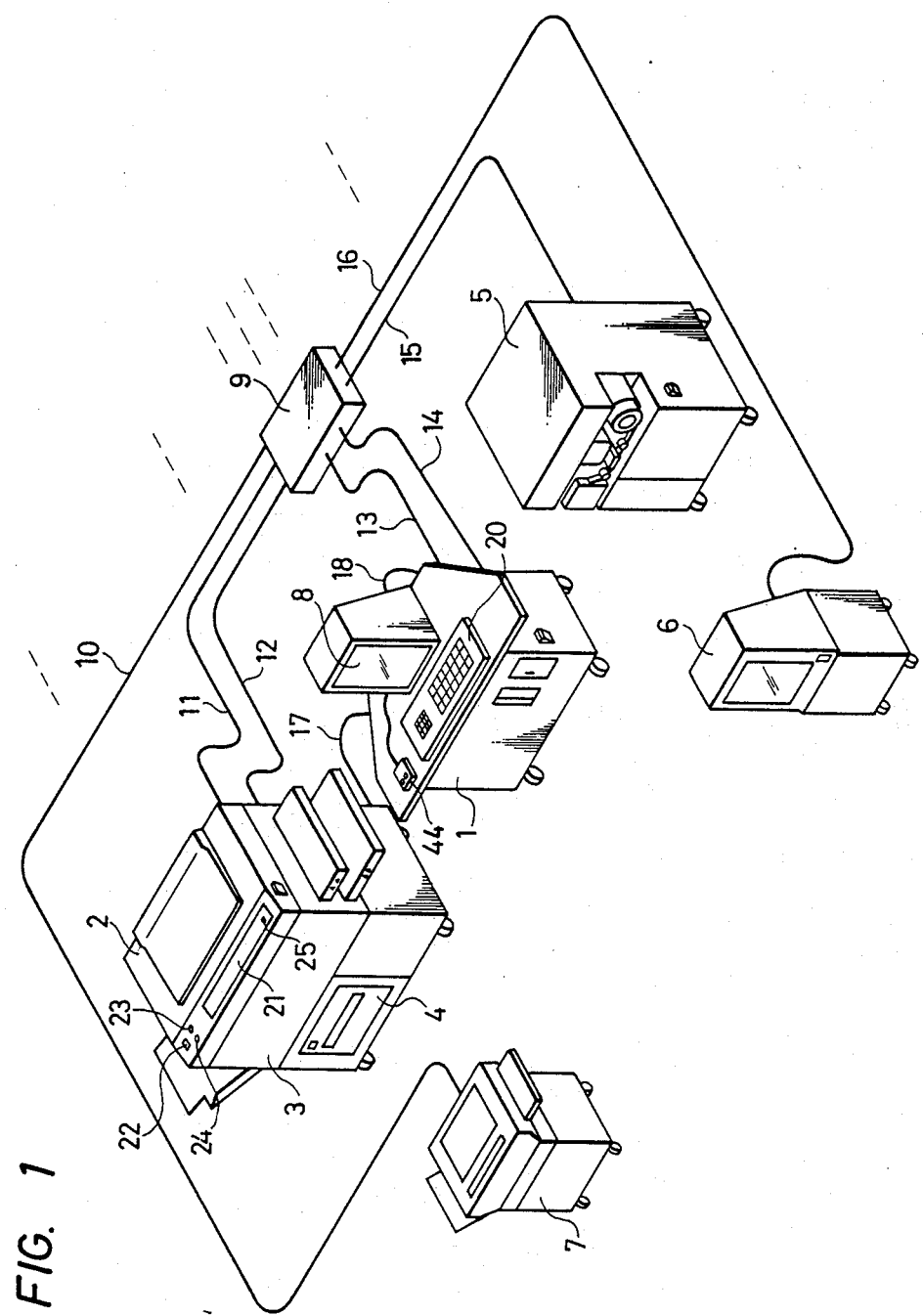
FIG. 1 is a perspective view showing the connection of an image processing system according to the present invention.

FIG. 1 is a perspective view showing connections of an image processing system according to the present invention. A control section (to be referred to as a work station or WS hereinafter) 1 has a system control microcomputer, an internal memory such as a RAM or ROM, and an external memory such as a floppy disk or a cartridge disk. An original reader 2 serves as an input section of a digital copying machine. The original reader 2 uses an image pickup device such as a CCD to read and convert information such as a photograph, a map, a picture or an original placed on an original table into electrical signals. The resolution of the original reader 2 can be changed in accordance with an instruction from the work station or the control section of the reader. A high-speed printer 3 such as a laser beam printer serves as an output section of the digital copying machine and records an image on a recording medium on the basis of information in the form of electrical signals. An image file 4 has a recording medium such as a photo disk (optical disk) or optomagnetic disk and allows the reading or writing of a large amount of information. A microfilm file 5 has a microfilm retrieval section and a microfilm reader for converting image information on a microfilm retrieved by the retrieval section into an electrical signal by means of an image pickup device. A high-resolution soft display 6 has a photosensitive belt consisting of a conductive belt-like base and a photoconductive layer formed thereon. A laser beam modulated, in accordance with an input image signal is irradiated onto the photoconductive layer through the base to form therein an electrostatic latent image in accordance with the intensity or brightness pattern of image light. The latent image formed on the photoconductive layer is developed with a toner (developer) held on a toner carrier and having conductivity and magnetism to form a display image. In the embodiment, the soft display 6 has the same resolution as that of the reader 2. However, the present invention is not limited to this. A printer 7 is similar to the printer 3 but has a smaller size and a lower speed than those of the printer 3. The printer 7 can be included or omitted as needed. When output resolutions of the printers 3 and 7 as output devices are different from each other, a selection can be made between high and low resolutions depending upon images (i.e., a photograph which requires a high resolution and a character which requires only a low resolution). A CRT device 8 displays image information which is photoelectrically read by the digital copying machine or an input scanner (reader) of the microfilm file, or displays control information of the system. A switching device 9 switches connections between respective input and output devices in accordance with a signal from the work station 1. Cables 10 to 18 electrically connect the respective input and output devices. A keyboard 20 is arranged at the work station 1. A pointing device 44 indicates the position of the CRT device 8 or information input. An operation instruction of the system, for example, a pixel density conversion instruction is entered by operating the keyboard 20 and the pointing device 44. These parts are the same when voice recognition or pattern recognition is performed. A control panel 21 is for inputting a control instruction of the digital copying machine. The control panel 21 has keys for setting the number of copies to be produced, the copying magnification, or pixel density; a copy start key 25 for instructing a start of the copying operation; and a numeral indicator. A mode switch 22 allows start of the reader from the side of the WS. Indicators 23 and 24 consist of light-emitting diodes (LEDs) for displaying the mode selection state by the mode switch 22. As indicated by dotted lines in FIG. 1, the scale of the system such as the number of WSs is not limited to that illustrated in FIG. 1.

Figure 2:
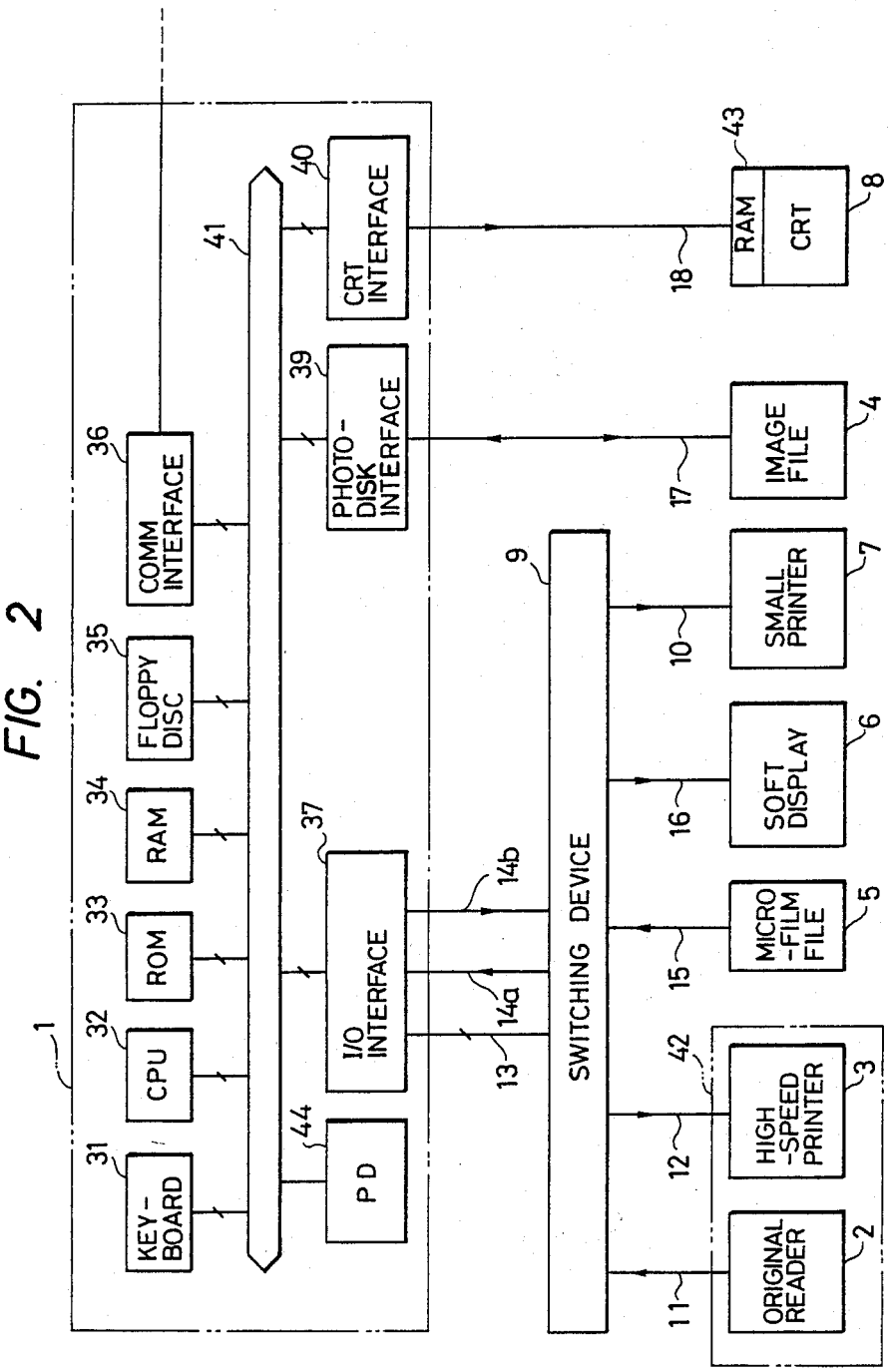
FIG. 2 is a block diagram showing the circuit configuration of the image processing system according to the present invention.

FIG. 2 is a block diagram showing the circuit configuration of the image processing system shown in FIG. 1. For the most part, the same reference numerals as in FIG. 1 denote the same parts in FIG. 2, and a detailed description thereof will be omitted. Each block of the work station 1 will first be described. A keyboard 31 corresponds to the keyboard 20 shown in FIG. 1, and the operator inputs a control instruction of the system through this keyboard 31. A central processing unit (CPU) 32 comprises a microcomputer (e.g., 68000 of Motorola). A read-only memory (ROM) 33 stores a control program for the system. The CPU 32 performs a control operation in accordance with the program stored in the ROM 33. A random access memory (RAM) 34 is mainly used as a working memory of the CPU 32 or a page memory (main memory) for storing image signals which are exchanged between the respective input and output devices. An external memory 35 comprising a floppy disk stores a control program of the system or a data base for image retreival from an image file to be described later. A communication interface 36 allows system expansion or information exchange with a similar system or a terminal device through a communication line such as a local area network. An I/O interface 37 allows information exchange between the work station 1 and the switching device 9. A photo disk interface 39 is for information exchange with the image file 4. A CRT interface 40 is for information exchange with the CRT device 8. A 16-bit bus 41 allows signal transfer between respective blocks in the work station 1. Cables 11 to 18 electrically connect the respective input/output devices as described above. Arrows on the respective cables indicate the direction of image signal transfer. Control signals are transferred in both directions in each cable. As can be seen from FIG. 2, the cables 11, 12, 15, 16 and 10 connect the original reader 2 and the high-speed printer 3 of a digital copying machine 42, the microfilm file 5, the soft display 6, and the small printer 7 to the switching device 9. The switching device 9 is connected to the working station 1 through the I/O interface 37 and the cables 13 and 14. The image file 4 and the CRT device 8 are connected to the interfaces 39 and 40 of the work station 1 through the cables 17 and 18, respectively. A display RAM 43 stores image information to be displayed. An image signal inputted or outputted through the switching device 9 is a serial signal and information on the bus 41 of the working station 1 is a parallel signal. Therefore, the I/O interface 37 has a serial-to-parallel register for fetching an image signal and a parallel-to-serial register for outputting an image signal.

An image signal outputted from the original reader 2 or the microfilm file 5 is supplied to the I/O interface 37 of the work station 1 through the switch device 9 in units of lines. The I/O interface 37 converts the input serial image signal into 16-bit parallel image signals and produces these signals onto the bus 41. The image signals on the bus 41 are sequentially stored in an image area of the RAM 34 in units of pages. The image signals stored in the RAM 34 in this manner are produced onto the bus 41 again and are produced externally through the communication interface 36. The image signals are also supplied to the image file 4 through the photo disk interface 39 and written in the photo disk. Alternatively, the image signals are transferred to the switching device 9 through the I/O interface 37 and are selectively supplied to the high-speed printer 3, the soft display 6 or the small printer 7 for image formation.

Image signals read out from the photo disk of the image file 4 are written in the RAM 34. Thereafter, the image signals are selectively transferred to the high-speed printer 3, the soft display 6 or the smaller printer 7 through the I/O interface 37.

Image signals from the original reader 2 or the microfilm file 5 are selectively and directly transferred in a corresponding mode to the high-speed printer 3, the soft display 6 or the smaller printer 7 through the switching device 9 and without going through the work station 1, When only a copying operation is to be performed, the image file 4 or the CRT device 8 is not required. Therefore, the copy operation is performed without using the work station 1 and by, for example, directly supplying image signals from the original reader 2 to the high-speed printer 3 to allow a real time copying operation. This mode will be referred to as the bypass mode.

Control of transmission of image signals is performed by the CPU 32 in accordance with a control instruction inputted by the operator.

In the system as described above, a plurality of output devices having different resolutions (image densities) can be used through a single input device.

Figure 3:
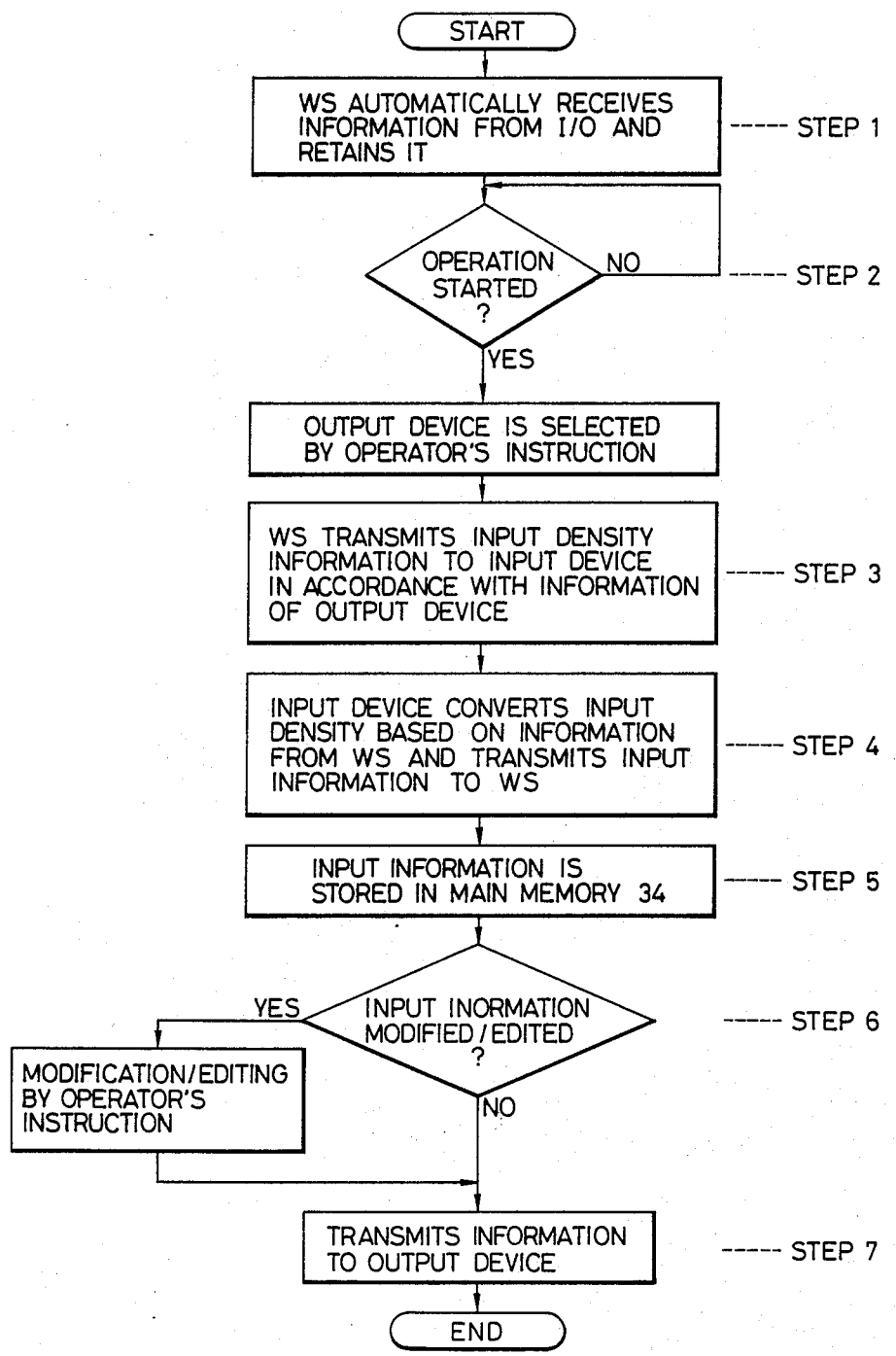
FIG. 3 is a flow chart of the image processing system according to the present invention.

FIG. 3 shows a flow chart according to the present invention. In step 1, the WS, during the initialization immediately after power on, fetches information (resolution, output paper size or the like) from a status register of a device such as an I/O device and detects devices connected thereto using a memory table at the WS side. When the operator selects an output device (step 2), the WS supplies input selection information suitable for the resolution of the selected output device to the input device 2 (step 3). Then, the input device 2 automatically changes the input resolution by deletion of the CCD pixel information or the like on the basis of the input section information and then supplies the input information to the WS (step 4). In step 5, the input information is stored in the RAM 34 of the WS. Note that the input information may be stored in the image film 4. When the input information is to be modified or edited, it is performed by a key input or the like (step 6). Since information suitable for the selected output device has been obtained in the above steps, the information is transferred from the RAM 34 to the output device and outputted thereby in step 7.

Figure 4:
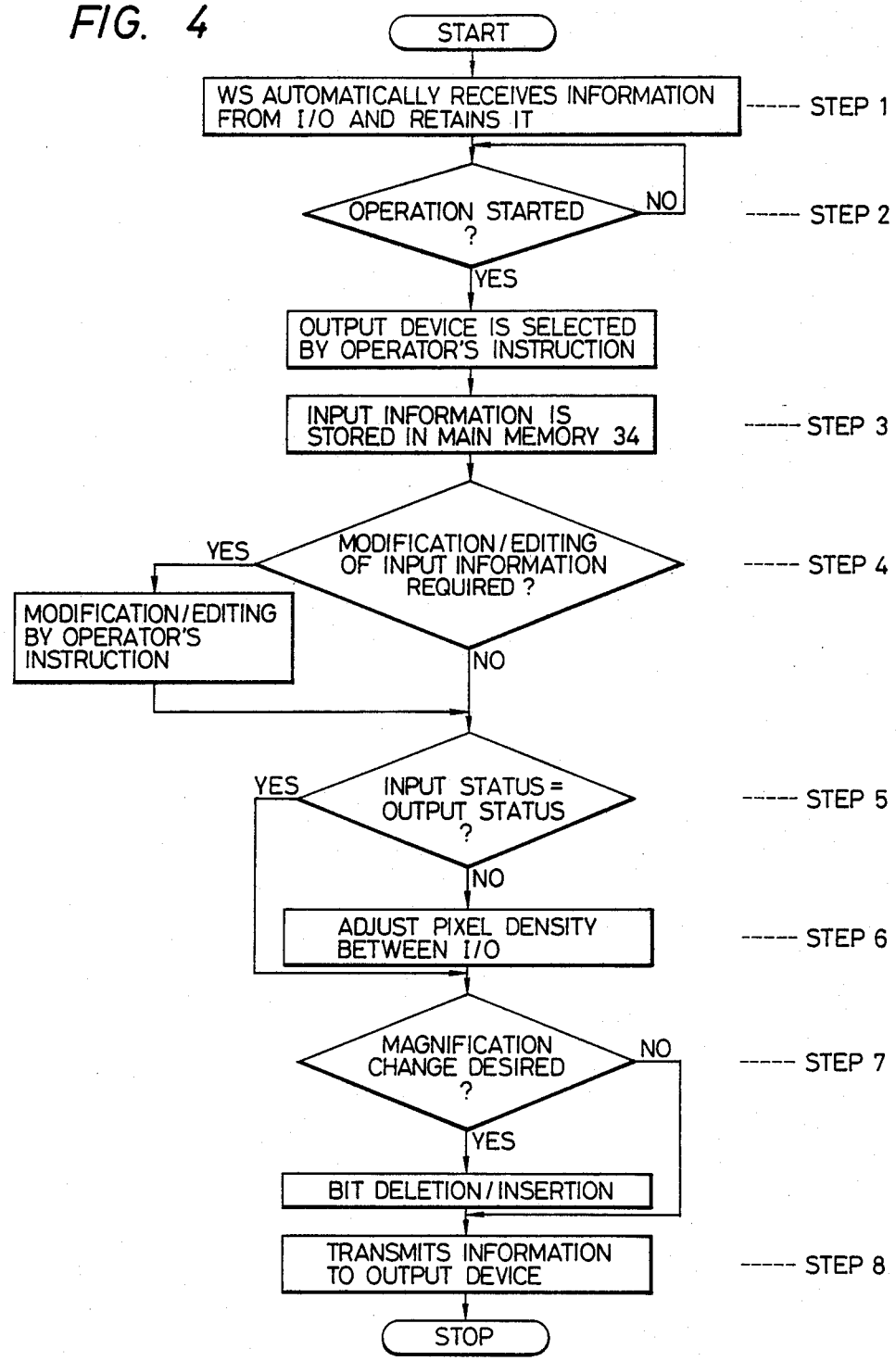
FIG. 4 is another flow chart of the image processing system according to the present invention.

FIG. 4 shows another flow chart according to the present invention. Steps 1 and 2 of FIG. 4 are the same as those of FIG. 3. In step 3, the input information is stored in the RAM 34. When the information is to be stored for future use, it can also be stored in the image file 4. If it is necessary, modification/editing is performed in step 4. In step 5, the resolutions of the input and output device sides are discriminated by comparing statuses, If it is determined in step 5 that the input and output devices have different resolutions and if it is required to adjust the pixel density to, for example, 75%, 1-bit is deleted from each 4-bits in vertical and horizontal directions of the image when the information is transferred from the RAM 34, in step 6. A pixel density suitable to the output device has been obtained in step 6. However, when the user wishes to output at a different pixel density, he instructs this from the input device side or the WS side. In step 7, a bit deletion or insertion is performed. In step 8, the obtained image information is outputted. When the resolution is controlled at the side of the input side as shown in FIG. 3, if input information is inputted at a desired resolution as in FIG. 4, an output at the desired resolution can be obtained at the output device. When modification or editing of input information is performed, data from the RAM 34 is displayed at the CRT display 8 in accordance with the pixel density corresponding to each device. Then, the operator of the WS can confirm the quality of the image corresponding to each resolution and can perform another pixel density conversion or editing such as magnification change. Thus, a system is provided which allows optimal control of the pixel density of image information in according with the system configuration.

When image information in transmitted from the reader 2 shown in FIGS. 1 and 2 as an input device to the output device 3, that is, in the bypass mode, the information can be directly transmitted to the output device 3 at a desired pixel density through the control panel 21.

What is claimed is:

1. An image processing system comprising:
   input means for inputting image information
   storage means for storing the image information input by said input means;
   a plurality of output means for outputting the image information read out from said storage means, said output means being selectably connected to said system;
   connecting means for connecting said input means and said storage means to each of said output means; and
   control means connected to said connecting means and having a function of detecting a parameter associated with the operation of each of said plurality of output means,
   wherein said control means controls input processing by said input means in response to a detected parameter of at least one of said output means to perform output processing, and controls said storage means such that the input information is stored in said storage means in accordance with said detected parameter.

2. An image processing system according to claim 1, wherein said input means comprises an image scanner, and said control means controls the input processing by controlling the image resolution of said image scanner.

3. An image processing system according to claim 1, wherein said control means controls said storage means such that said at least one of said output means outputs the image information stored in said storage means.

4. An image processing system according to claim 1, wherein the detected parameter includes data representing the image resolution of each of said plurality of output means.

5. An image processing system comprising:
   storage means for storing image information and pixel density data relating to the image information;
   a plurality of output means for outputting the image information stored in said storage means, said output means being selectably connected to said system;
   instruction means for instructing one of said plurality of output means connected to said system to output the image information stored in said storage means;
   transmitting means for transmitting data, such as the output capacity of said one output means instructed by said instruction means;
   comparing means for comparing data which has been transmitted by said transmitting means with pixel density data of the image information stored in said storage means; and
   converting means for converting the pixel density in accordance with an output from said comparing means,
   wherein said image information is output without changing a size of said image information, the resulting pixel density being obtained by converting said pixel density.

6. A system according to claim 5 wherein said converting means controls readout of the image information from said storage means and converts the pixel density in accordance with information from said comprising means.

7. A system according to claim 5, further comprising display means for displaying the image information at a pixel density obtained by conversion by said converting means.

8. An image processing system according to claim 5, wherein, said instruction means is adapted to instruct a plurality of said output means connected to said system to output the image information.

9. An image processing system comprising:
   input means for inputting image information;
   a plurality of output means for outputting the image information, said output means being capable of being selectively connected to said input means and each having a relatively different image resolution;
   instructing means for designating one of a first instruction and a second instruction, the first instruction being an instruction to output an image represented by the image information in accordance with an image resolution of a selectively connected one of said plurality of output means and the second instruction being an instruction to output the image;
   with a desired image resolution regardless of an image resolution of the selectively connected one of said output means; and
   converting means for converting the image resolution on the basis of the instruction designated by said instructing means,
   wherein said converting means converts the image resolution on the basis of the first instruction without changing a size of the image, and wherein said converting means converts the image resolution on the basis of the second instruction, changing the size of the image.

10. A system according to claim 9, wherein, when a pixel density which should be outputted by said output means is lower than a pixel density which can be inputted by said input means, said converting means matches the pixel density of said input means with the pixel density of said output means.

11. A system according to claim 9, further comprising display means for displaying and confirming the image information in accordance with the pixel density associated with the image processing.

12. A system according to claim 9, wherein said setting means sets a pixel density associated with an input of said input means.

13. A system according to claim 9, wherein said instructing means is arranged on the side of said input means.

14. An image processing system comprising:
   input means for inputting image information;
   storage means for storing the image information input by said input means;
   output means for outputting the image information; and
   control means for managing and controlling said system, said system having a first mode for setting a desired pixel density of said output means at said input means and a second mode for setting the desired pixel density of said output means at said output means,
   wherein said control means controls said input means, said storage means and said output means such that the image information stored in said storage means is converted to the desired pixel density without changing a size of an image represented by the image information between said input means and said storage means in the case of the first mode and the image information stored in said storage means is converted to the desired pixel density between said storage means and said output means in the case of the second mode.

15. An image processing system according to claim 14, wherein in the first mode, the conversion is performed by input processing by said input means.

16. An image processing system according to claim 14, in the second mode, the conversion is performed upon reading image information from said storage means.

* * * * *

UNITED STATES PATENT AND TRADEMARK OFFICE
CERTIFICATE OF CORRECTION

PATENT NO. : 4,891,634
DATED : January 2, 1990
INVENTOR(S) : KENZOH INA ET AL.        Page 1 of 2

It is certified that error appears in the above-identified patent and that said Letters Patent is hereby corrected as shown below:

COLUMN 1

Line 6, "continuation-in-part" should be deleted.

COLUMN 4

Line 15, "11 to 18" should read --10 to 18--.

COLUMN 5

Line 21, "section" should read --selection--.

COLUMN 6

Line 5, "information" should read --information;--.
    Line 60, "sulting" should read --sultant--.
    Line 62, "claim 5" should read claim 5,--.

COLUMN 7

Line 4, "wherein," should read --wherein--.
    Line 20, "image; ¶ with" should read --image with--.

UNITED STATES PATENT AND TRADEMARK OFFICE
CERTIFICATE OF CORRECTION

PATENT NO. : 4,891,634
DATED : January 2, 1990
INVENTOR(S) : KENZOH INA ET AL.   Page 2 of 2

It is certified that error appears in the above-identified patent and that said Letters Patent is hereby corrected as shown below:

COLUMN 8

Line 37, "14, in" should read --14, wherein in--.

Signed and Sealed this

Twenty-seventh Day of August, 1991

Attest:

HARRY F. MANBECK, JR.

Attesting Officer

Commissioner of Patents and Trademarks